(12) United States Patent
Ramani et al.

(10) Patent No.: US 7,725,299 B2
(45) Date of Patent: May 25, 2010

(54) MULTI-TIER AND MULTI-DOMAIN DISTRIBUTED RAPID PRODUCT CONFIGURATION AND DESIGN SYSTEM

(75) Inventors: Karthnik Ramani, West Lafayette, IN (US); Srikanth Devanathan, West Lafayette, IN (US); Jayanti Subramaniam, West Lafayette, IN (US); Robert Thomas Brent Cunningham, Stamford, CT (US); Christopher Peters, Rolling Meadows, IL (US)

(73) Assignee: Purdue Research Foundation, West Lafayette, IN (US)

( * ) Notice: Subject to any disclaimer, the term of this patent is extended or adjusted under 35 U.S.C. 154(b) by 819 days.

(21) Appl. No.: 11/068,482

(22) Filed: Feb. 28, 2005

(65) Prior Publication Data

US 2006/0020629 A1    Jan. 26, 2006

Related U.S. Application Data

(60) Provisional application No. 60/548,988, filed on Mar. 1, 2004.

(51) Int. Cl.
| | |
|---|---|
| G06F 17/50 | (2006.01) |
| G06F 7/60 | (2006.01) |
| G06F 19/00 | (2006.01) |
| G01B 3/22 | (2006.01) |
| G06F 17/30 | (2006.01) |
| G06F 7/00 | (2006.01) |

(52) U.S. Cl. .................. 703/1; 703/2; 703/14; 703/7; 703/20; 700/97; 700/103; 702/22; 702/167; 705/26; 705/27; 707/10; 707/203

(58) Field of Classification Search .............. 703/2, 703/1, 7, 14, 20; 700/97, 103; 702/22, 167; 705/26, 27; 707/10, 203
See application file for complete search history.

(56) References Cited

U.S. PATENT DOCUMENTS

| | | | |
|---|---|---|---|
| 5,357,440 A | | 10/1994 | Talbott et al. |
| 5,552,995 A | | 9/1996 | Sebastian |
| 5,680,530 A | * | 10/1997 | Selfridge et al. ............ 345/440 |
| 5,708,798 A | * | 1/1998 | Lynch et al. .................. 703/1 |
| 5,745,765 A | * | 4/1998 | Paseman ..................... 717/107 |
| 5,748,943 A | | 5/1998 | Kaepp et al. |
| 5,825,651 A | * | 10/1998 | Gupta et al. ................ 700/103 |
| 5,950,011 A | | 9/1999 | Albrecht et al. |

(Continued)

OTHER PUBLICATIONS

Szykman et al. "Design Repositories: Engineering Design's New Knowledge Base" IEEE Intelligent Systems 2000.*

(Continued)

*Primary Examiner*—Kamini S Shah
*Assistant Examiner*—Shambhavi Patel
(74) *Attorney, Agent, or Firm*—Schwegman, Lundberg & Woessner, P.A.

(57) ABSTRACT

Techniques are presented for a multi-tier distributed frame work for mass configuration of products by design and synthesis. Products are represented as components having hierarchical relationships with one another. The components include form information, function information, behavioral information, and constraint information. Components may be created from scratch or retrieved from a plurality of sources over a network. In some embodiments, the components may include optimization constraints and derived from other components to meet the optimization constraints.

11 Claims, 15 Drawing Sheets

U.S. PATENT DOCUMENTS

| | | | |
|---|---|---|---|
| 6,018,625 A | | 1/2000 | Hayball et al. |
| RE36,602 E | | 3/2000 | Sebastian et al. |
| 6,300,948 B1 | * | 10/2001 | Geller et al. ............. 715/866 |
| 6,490,715 B1 | | 12/2002 | Moriwaki et al. |
| 6,512,995 B2 | * | 1/2003 | Murao .................... 702/167 |
| 6,772,026 B2 | | 8/2004 | Bradbury et al. |
| 6,795,832 B2 | * | 9/2004 | McGeorge et al. ......... 707/203 |
| 6,810,401 B1 | | 10/2004 | Thompson et al. |
| 6,847,970 B2 | | 1/2005 | Kar et al. |
| 6,847,974 B2 | | 1/2005 | Wachtel |
| 6,851,094 B1 | | 2/2005 | Robertson et al. |
| 6,851,115 B1 | | 2/2005 | Cheyer et al. |
| 6,859,768 B1 | * | 2/2005 | Wakelam et al. ............. 703/1 |
| 6,983,187 B2 | * | 1/2006 | Kern ......................... 700/97 |
| 7,079,990 B2 | * | 7/2006 | Haller et al. ................ 703/2 |
| 7,587,380 B2 | * | 9/2009 | Huelsman et al. ........... 706/47 |
| 2002/0004710 A1 | * | 1/2002 | Murao .................... 702/167 |
| 2002/0029114 A1 | * | 3/2002 | Lobanov et al. ............. 702/22 |
| 2002/0059054 A1 | * | 5/2002 | Bade et al. ................. 703/20 |
| 2002/0143653 A1 | * | 10/2002 | DiLena et al. ............. 705/26 |
| 2002/0165701 A1 | * | 11/2002 | Lichtenberg et al. ......... 703/7 |
| 2003/0050859 A1 | * | 3/2003 | Rodriguez et al. .......... 705/27 |
| 2003/0126136 A1 | * | 7/2003 | Omoigui .................... 707/10 |
| 2003/0139975 A1 | * | 7/2003 | Perkowski .................. 705/26 |
| 2003/0229482 A1 | * | 12/2003 | Cook et al. ................ 703/14 |
| 2005/0071135 A1 | * | 3/2005 | Vredenburgh et al. ......... 703/1 |

OTHER PUBLICATIONS

Lacroix, Zoe. "Reusing Mechanical Engineering Design" IEEE 2003.*

Regli et al. "Mechanical Digital Libraries for Computer-Aided Design" Computer Aided Design 32- 2000.*

Trujillo, et al. "Designing Data Warehouses with OO Conceptual Models", IEEE 2001.*

Bilgic, et al. Product Data Management SYstems: State of the Art and the Future, 1997 ASME Design Engineering Technical Conferences.*

Heintz et al. "Constraint Databases, Data Structures, and Query Evaluation", 2004.*

Koegst et al. "IP Retrieval by Solving Constraint Satisfaction Problems", 2000.*

Lacroix, Z., "Reusing Mechanical Engineering Design", *Information Reuse and Integration*, 2001. IRI 2003., IEEE International Conference on Oct. 27-29, 2003,299-304.

Regli, W. C., et al., "Managing Digital Libraries for Computer-Aided Design", *Computer Aided Design*, Elsevier Publishers, vol. 32 (2), (Feb. 2000),119-132.

Sivaloganathan, S., et al., "Design reuse: an overview", *Proceedings of the Institution of Mechanical Engineers*, vol. 213 (B07), (1999),641-654.

Szykman, S., et al., "Design Repositories: Engineering Design's New Knowledge Base", *Design Repositories: Engineering Design's New Knowledge Base*, vol. 15 (3), IEEE Intellegent Systems, IEEE Computer Society, Los Alamitos, CA,(May 2000),48-55.

* cited by examiner

MULTI-TIER AND MULTI-DOMAIN DISTRIBUTED RAPID PRODUCT CONFIGURATION AND DESIGN SYSTEM

RELATED APPLICATIONS

This application claims the priority benefit of U.S. Provisional Application No. 60/548,988, entitled: "Multi-Tier and Multi-Domain Distributed Rapid Product Configuration and Design System," filed Mar. 1, 2004, which is incorporated by reference herein.

FIELD OF THE INVENTION

The invention relates generally to data modeling and more particularly to modeling product concepts or components and searching and retrieving the components over a distributed network.

BACKGROUND OF THE INVENTION

Design is the most important stage in the process of realizing a product. Almost 95% of production costs are committed during the design phase of a product. Hence manufacturers spend considerable time and effort in avoiding errors. The design phase necessitates that the designer perform a set of tasks repeatedly to ascertain the feasibility and effectiveness of a particular design. Some of these tasks cannot be performed without the creativity of the designer. Moreover, these tasks are interconnected and hence warrant an iterative design process. To reduce the design time, the time taken for each execution of the steps and the number of design iterations themselves are to be minimized. The advent of computers and consequently tools such as Analysis, Optimization and 3D (three-dimensional) parametric modeling has greatly reduced the design time by reducing the time taken to perform each step.

Just as mass production was crucial to manufacturing in the $20^{th}$ century, mass customization will be the key to economic growth in the $21^{st}$ century. Making this transition will be difficult for product manufacturers because of a number of issues. One significant issue is the elapsed time associated with the design phase of products, especially those that employ diverse supply networks. Currently, an excessive amount of engineering time is spent searching for, analyzing, and modeling (CAD (Computer-Aided Design)) existing products and concepts for viable designs. Configuration helps to reduce design time by capturing the internal knowledge of a company in the form of rules and allowing quick production of design variants. An intelligent system across diverse supply networks is imperative to synthesize customized products by means of rapid configuration. Current configuration systems are limited to a single class of products and intra-company use.

The past century has been the age of mass production, ever since Henry Ford began his assembly line in 1903. Mass customization is the production of customized products at mass production rates. Mass customization trends have been observed in markets such as clothes (Lands' End), computers (Dell and bicycles (NBIC Japan). Customers' underlying desires, motivations and emotional triggers are the foundation for an industry's success. Many industries have innovated by using the power of the modular product architecture. Designs have been modularized in order to (1) increase variety, (2) postpone product differentiation to customize for local markets, (3) reduce inventory costs, and (4) reuse parts, associated process, and infrastructure across products. This sales model, which has been proven by companies such as Dell and Black & Decker, requires manufacturers to be market-driven and customer-responsive, which means offering more product variants, thereby adding more options and allowing customization.

Adopting mass customization poses some serious challenges and significant business benefits for manufactured product environments and particularly for the United States' economy. Twenty years ago, collocation of supply chain entities allowed for concurrent engineering and knowledge sharing within a company. In the past decade, organizations have become specialized in engineering functions and have found it economical to outsource manufacturing. The knowledge transfer and exchange among entities in a supply chain may be referred to as the Knowledge Supply Chain (KSC). Today the KSC is inefficient because outsourcing dramatically increases the number of places where the KSC can break down, and amasses hidden costs and times.

Some major challenges associated with mass customization in a dispersed product engineering environment are: (1) coordination of the product design across suppliers, (2) flexibility in the manufacturing infrastructure, (3) finding appropriate resources such as standard parts, and (4) effective human interaction. In addition, products should be engineered to manufacture in the volumes, times, and economies demanded by the consumer. When these challenges are addressed, the vision of mass customization promises manufacturers several benefits: they could offer more services, achieve greater levels of customer satisfaction and loyalty, gather advance information on market trends, and reduce inventory levels.

Thus, there is a desire to improve the design phase of product development to permit greater coordination within the industry and to leverage existing knowledge.

SUMMARY OF THE INVENTION

According to an embodiment, components for a product design are assembled and represented as a data structure having constraints among the various components. Each component is also associated with a graphical form. The product design, constraints, components, and graphical form are indexed in a data store for subsequent search, retrieval and integration.

DETAILED DESCRIPTION

Figure 1:
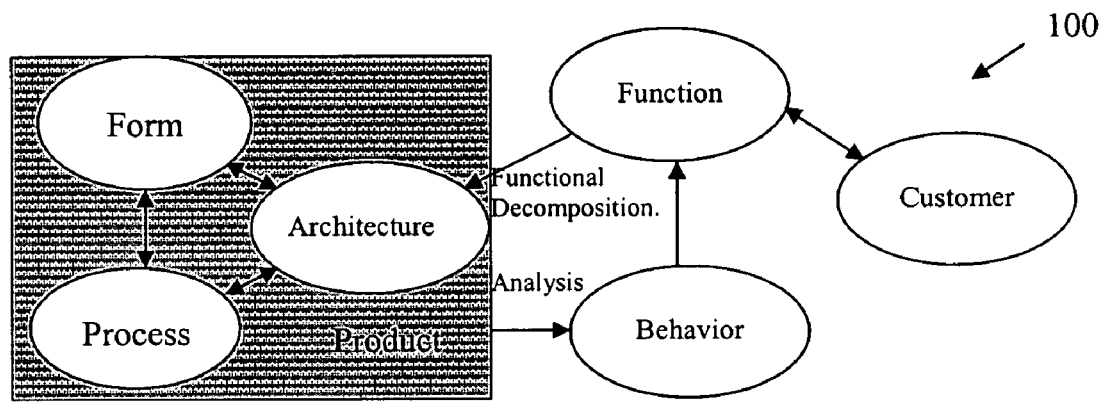
FIG. 1 is a diagram of mappings between various aspects of a product, according to an example embodiment of the invention.

FIG. 1 is a diagram 100 of mappings between various aspects of a product, according to an example embodiment of the invention. The design process can be considered as a map from the perceived Customer Requirements (CRs) to the final embodiment of the product that is believed to satisfy the requirements. The various aspects of the product include its architecture, form, behavior, manufacturing or fabrication process and its function.

The design process tends to instantiate each of the various aspects of the product with minimal or no conflicts. Although maps may exist between the different domains/aspects, a definite map does not exist from the Function to the aspects of the product, as is shown in FIG. 1. The main reason for the absence of this map is that any design process necessarily involves the creativity of the designer for purposes of synthesizing different solutions. Also, this map is not well defined because human creativity cannot be captured mathematically.

Figure 2:
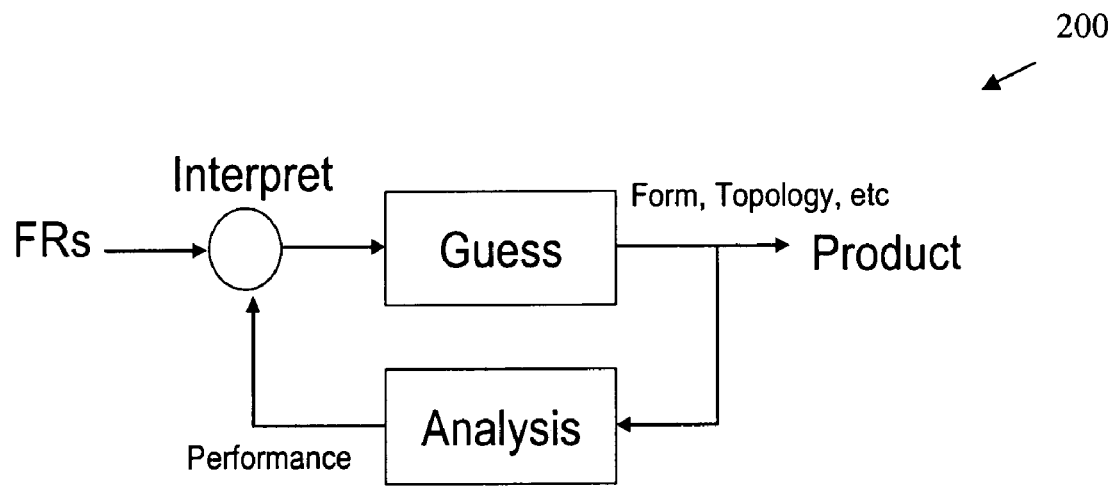
FIG. 2 is a diagram of a conventional design process.

To start the Product Realization process, the CRs are interpreted into Functional Requirements (FRs) through methods such as quality Function Deployment (QFD). These FRs form the input to the Design process. Thus, FIG. 2 depicts a diagram 200 of a conventional product realization process including two closed loop processes. It is shown in FIG. 2 that the Design mapping is emulated through a closed loop system where creative synthesis forms the feed-forward link and analysis forms the feedback link. The actual use of the product by the customer forms the feedback link in the outer loop of the system.

Products are redesigned more often than complete new designs are generated. Moreover, most designs are a combination of previous designs which are used in a new way. Hence, an understanding of the various types of redesigns is important to capture knowledge associated with the design process.

Redesigns are typically achieved through the following means:
1) Small modifications to a product for better performance without considerable change in the product's form or process; no real change in the product architecture occurs.
2) Modification of the product's form/process within the same architecture which could involve creation of new product parameters and large changes to existing parameters. This includes redesigns of the parts in the product.
3) Modifications to the product architecture which involves incorporation of new sub-components; thereby changing the overall product aspects.

FIG. 3 is a diagram 300 of a hierarchical representation of a product, according to an example embodiment. The diagram 300 shows the hierarchical nature of product data with the product parameters at the lowest level of the hierarchy. The parameters are specific to the form/process description of the product, which forms the next higher level of data within the hierarchy. The product's form/process provides the context for understanding the parameters. Furthermore, the product's form/process description is a direct consequence of the product architecture, topology and the design knowledge. The architecture and topology of a concept are designed to satisfy the functional requirements.

With this hierarchical representation of a product and/or additional information such as analysis, a mathematical or machine interpretable format for a product concept will now be presented. The phrases and terms "product design," "product concept," "product design concept," "concept," "component," "analysis" and "analysis concept" may be used interchangeably herein. Furthermore, a single component may include a variety of sub-components, such that each sub-component is its own independent concept. This comports with the idea that a Concept may be logically viewed in a recursive manner.

Mathematical Framework for Concept Representation

In an embodiment, a Concept $\Phi$ is represented as a set consisting of (1) Concept graph ($\Psi$), (2) Parameters (R), (3) Form definition ($\xi$), (4) Process definition (S), (5) Maps (M) and (6) Constraints (N), i.e.:

$$\Phi=\{\Psi,R,\xi,S,M,N\}$$

The concept graph is represented as a set consisting of the list of sub-concepts and their connectivity. This connectivity may include functional, operational, informational as well as physical interactions. This connectivity signifies the constraints posed by the interactions between the sub-concepts in fulfilling a functional requirement.

Figure 3A:
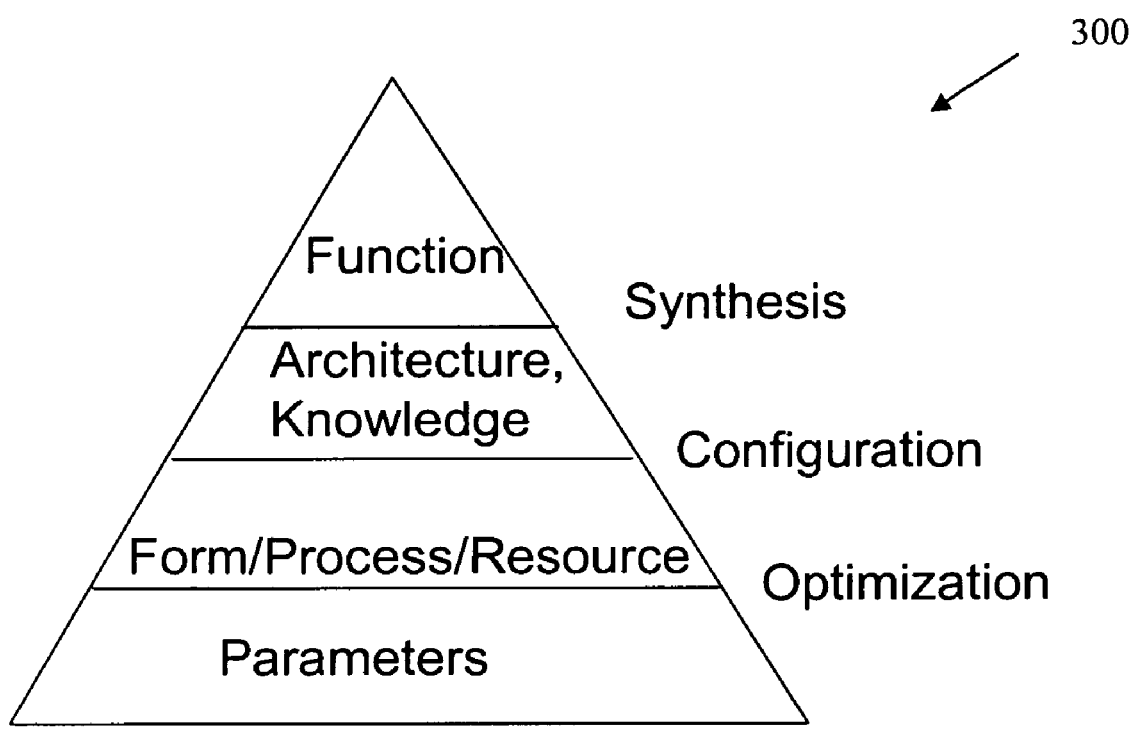
FIG. 3A is a diagram of a hierarchical representation of a product, according to an example embodiment.
Figure 3B:
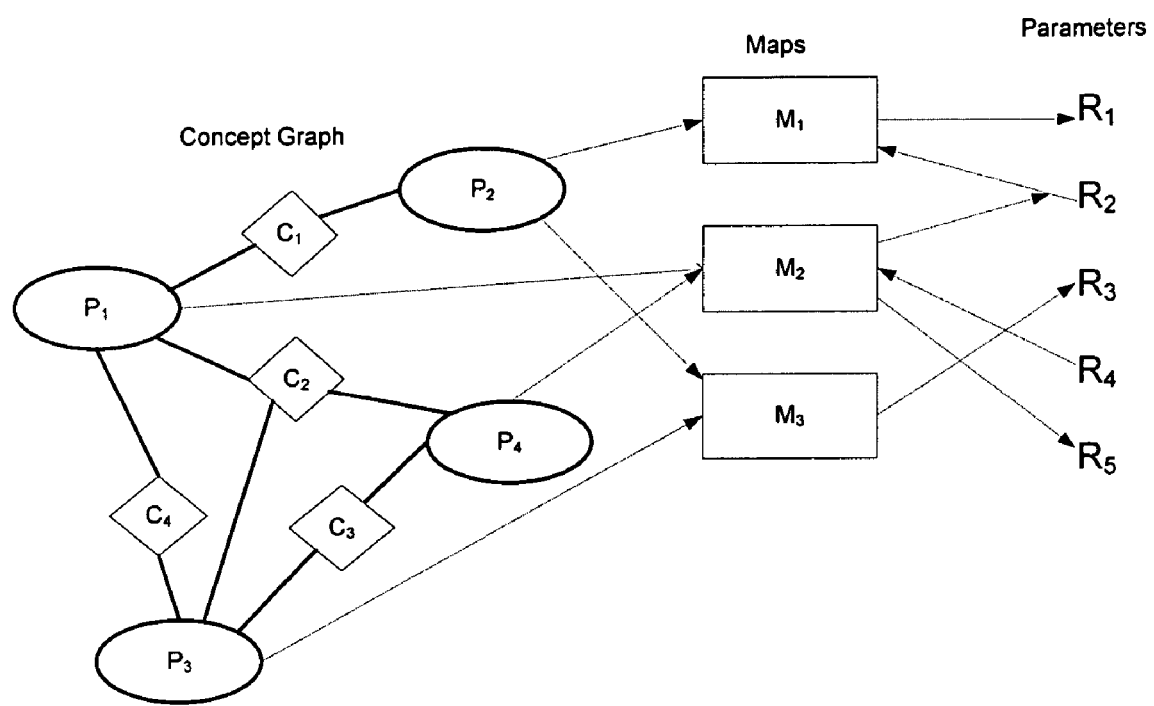
FIG. 3B is a diagram of the product concept graph, maps and parameters of a product concept, according to an example embodiment.
Figure 3C:
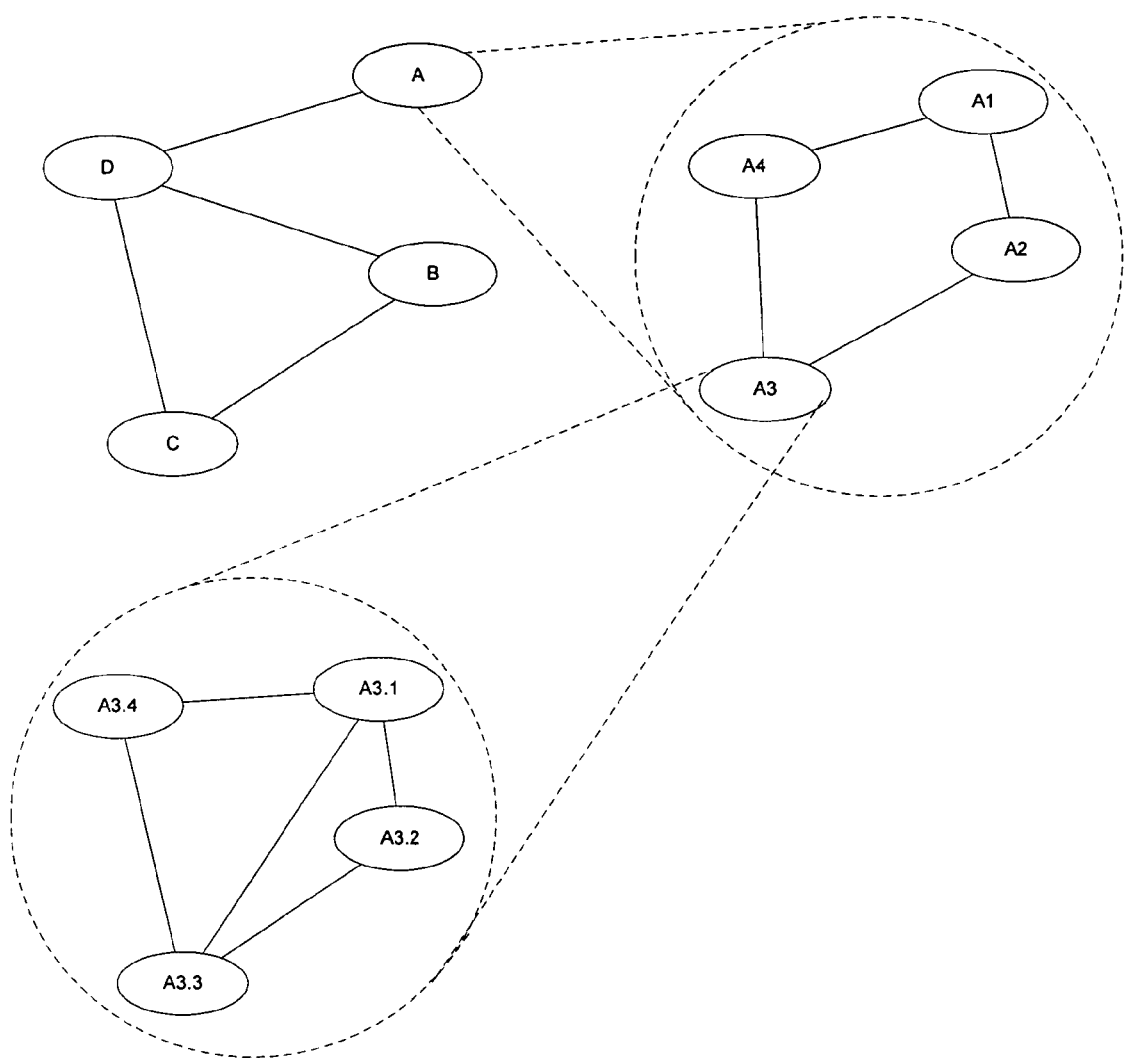
FIG. 3C is a diagram of the recursive nature of the product concept, according to an example embodiment.

Let $P=\{P_1, P_2, \ldots, P_n\}$, the set of n sub-concepts and $C=\{(\Gamma,P_c)\}$, the set of constraints each of which is represented as an expression r involving sub-concepts $P_c$ with $P_c \subseteq P$, then $\Psi(\Phi)=\{P,C\}$. Further, $R=\{R_1, R_2, \ldots R_k\}$, the set of k parameters are defined by the maps M as $R_i=M_j(P_c,R_c)$, where $P_c \subseteq P$, $R_c \subseteq R$ and $M_j \in M$. FIG. 3B represents an example Product Concept with Maps, Concept Graph and Parameters. A product concept graph includes components and linkages representing constraints between components. Each component may itself be a design or a sub-concept. The concepts and sub-concepts may also be recursive as is depicted in FIG. 3C. It is noted that the maps and expressions could involve algorithmic evaluations such as structural analysis, or tasks involving humans.

This framework captures the constraints that need to be satisfied to create a viable product based on the concept. The generic nature of the constraints and the above framework enable rapid automated redesign of a product within the same concept. Representation of said maps as a concept graph, yields a constraint linked nodal interpretation that can be represented in a computer readable and searchable format. These representations can be called Analysis Concepts.

The constraints N are similar to C in expression, but operate only on the Concept $\Phi$. In an example embodiment, the set N may include constraints such as $\Phi.\text{color} \neq \text{Green}$ or $\Phi \in (\text{Supplier1.Catalog} \vee \text{Supplier2.Catalog})$ in case of a Product Concept, and constraints such as Φ.iterations≦500 in the case of Analysis Concept. These constraints operate only at the Concept level (Φ). The process description S may include the Supply chain representation for Product concepts and the Evaluation procedure for Analysis Concepts.

The form description for a concept or sub-concept is defined by a tuple, $\xi=(\gamma,\tau)$ where: $\gamma=\{\gamma_1, \gamma_2, \ldots, \gamma_m\}$ is the set of geometric features composing a shape, and r is a m×m adjacency matrix that defines the topological connectivity between elements of γ. The set γ that describes the form of a concept is a set of geometric entities (surface or volume elements) that satisfy the (geometric) constraints and functional requirements of the particular concept. The adjacency matrix is defined as $\tau=[\tau_{uv}]_{m \times m}$ where:

$$\tau_{uv} = \begin{cases} 1 & \text{if } \gamma_u \text{ is adjacent to } \gamma_v \\ 0 & \text{if not} \end{cases}$$

For a form to exist, both γ and τ must be non-zero.

Figure 3D:
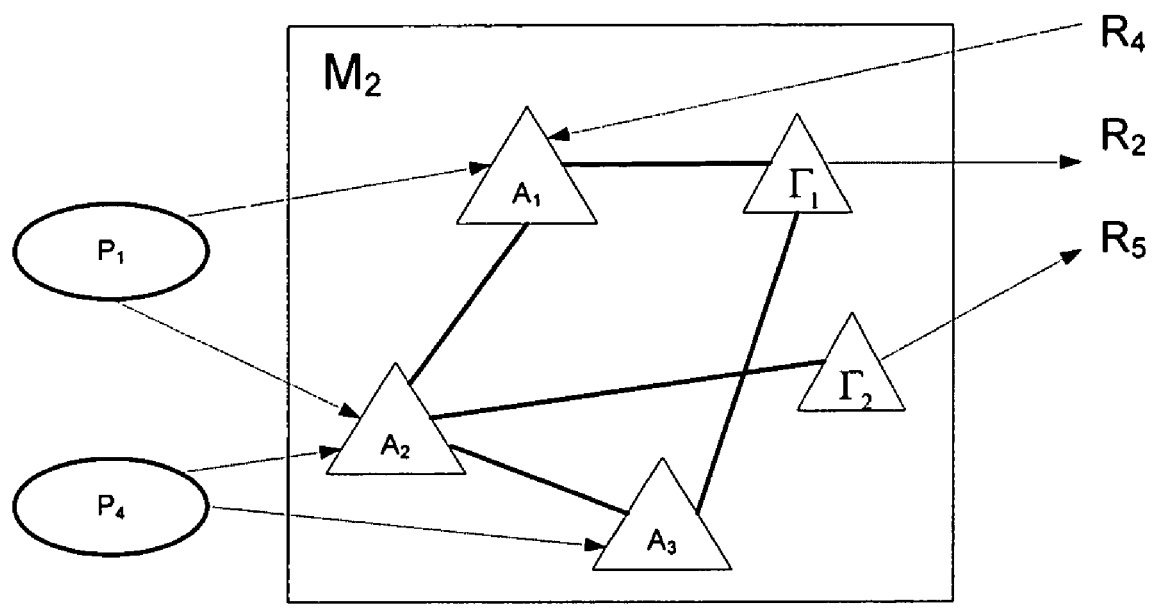
FIG. 3D is a diagram of an analysis concept graph as a part of a map, according to an example embodiment.

The Maps M, in general for Product Concepts, involve concurrent analyses across multiple domains. FIG. 3D represents the map $M_2$ of FIG. 3B that involves Analyses $A_1$, $A_2$, and $A_3$, as well as expressions $\Gamma_1$ and $\Gamma_2$. In an example embodiment where the concept in FIG. 3B represents a gas turbine engine, $P_1$ represents the Combustor while $P_4$ represents the Turbine blade. In this way, the Thermal Analysis $A_1$ interacts with the Combustor $P_1$, Operating temperature $R_4$, and the CFD (Computational Fluid Dynamics) analysis $A_2$ to evaluate Thermodynamic parameters. Similarly, The CFD analysis $A_2$ interacts with the Turbine blade $P_4$, Structural Analysis $A_3$ and Thermal Analysis $A_1$ to evaluate the power generated. The expressions $\Gamma_1$ and $\Gamma_2$ evaluate the Efficiency $R_2$ and Thrust $R_5$.

Design Process in the Concept Framework

The design process may be viewed as following a top-down approach during the configuration design and a bottom-up approach during optimization. Any decision point in the design process may involve human interaction with the system. In this embodiment, one can identify the following tasks that involve human input:

1) Design a new Concept
2) Modifying, adding and removing constraints.
3) Substituting or operating with concepts.
4) Generation of form.

Product architecture design concerns the configuration design (synthesis of a product mainly by determining what components and subassemblies are spatially and logically arranged). The design process begins by deciding the functional requirement on sub-concepts to satisfy the required functional requirement. This may involve techniques such as functional decomposition. Many concepts exist to satisfy each of the decomposed functional requirements resulting in different product architectures. These concepts can be substituted for each of the sub-concepts and the constraints formulated among them.

A particular choice of sub-concepts results in a single product architecture with the product topology/concept graph describing the interactions between them. It is now advantageous to find instances of each sub-concept that do not violate any constraints and satisfy the functional requirement. The performance parameters can now be mapped from the choice of sub-concepts and the nature of interaction. Once the choice of the sub-concepts is achieved, the form and process descriptions of the product can be designed. The form of the product may be an assembly of the forms of the components from the sub-concepts. It is noted that only the general nature of the form is decided initially. The complete set of parameters is now available to optimize a particular instance of the concept. The optimal choice of parameter values are now used to generate the form for this instance of the concept architecture resulting in a configuration solution.

Automating the above process can help the designer to quickly design, instantiate, and evaluate various product concepts for a set of functional requirements (FRs). An ideal form of a component can be automatically obtained through techniques such as Topology Optimization. However, post processing of the Topologically optimal shape can be used to generate forms that satisfy other constraints such as manufacturability and cost. For example, in the automated design of a Tube-Frame chassis for the Formula SAE Car is obtained by skeletonizing the topologically optimal solution and choosing appropriate tubular cross-sections.

In order to more effectively drive design it is desirable to generate and access knowledge in a timely fashion. Due to the increase in popularity of CAE packages, computerized analysis has come to represent the desired repository for design knowledge. The ability to reuse knowledge allows for much quicker synthesis of a product design and drastically lowers the perceived amount of redesign required. This application has the advantage that it can be scaled to fit almost any application from simple catalog queries by customers to advanced representation and searching for existing analysis and models. The key enabler to knowledge extraction is the reusable, extensible representation of the knowledge contained in the analysis through the Analysis Concept.

Figure 4:
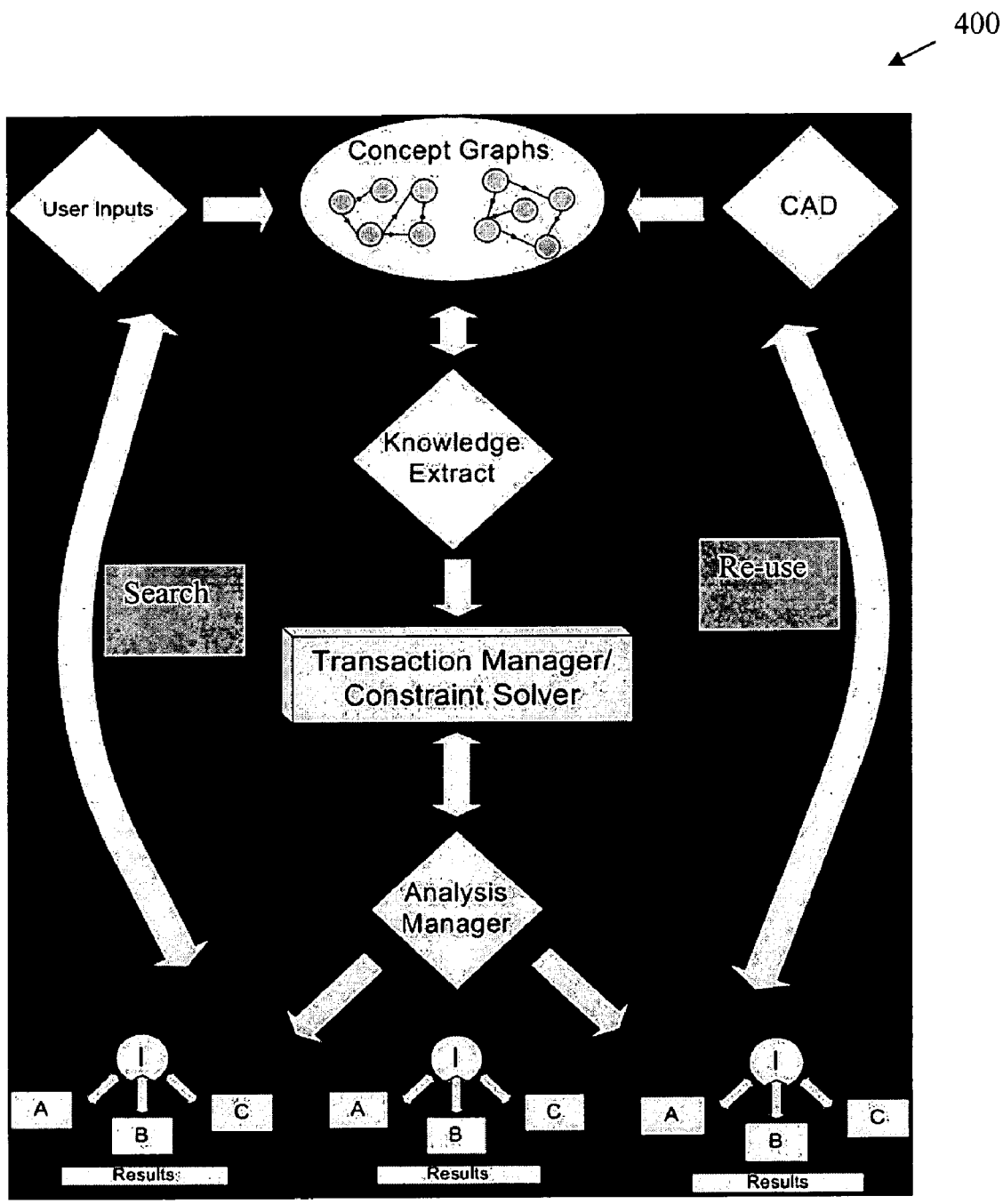
FIGS. 4 and 5 are diagrams of multi-tier and multi-domain distributed rapid product configuration and design systems, according to example embodiments.
Figure 5:
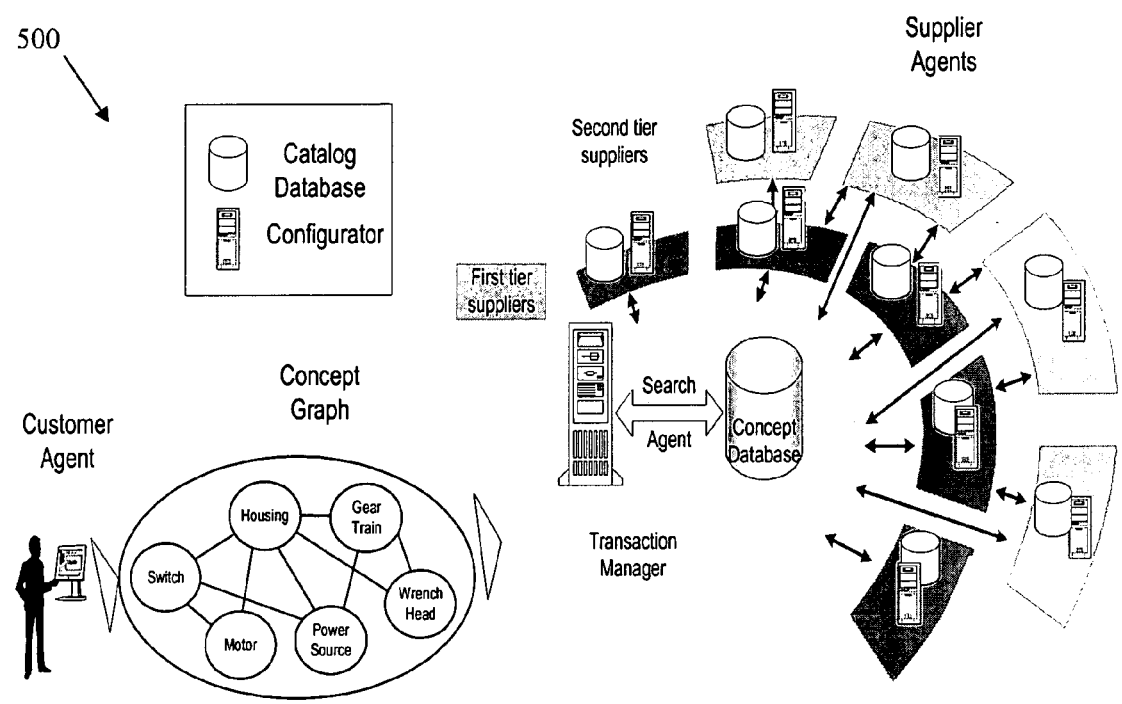

FIGS. 4 and 5 are diagrams of multi-tier and multi-domain distributed rapid product configuration and design systems 400-500, according to example embodiments. The multi-tier and multi-domain distributed rapid product configuration and design systems 400-500 are implemented in a machine-accessible and computer-readable medium and is operational over a network. The network may be wired, wireless, or a combination of wired and wireless. The multi-tier and multi-domain distributed rapid product configuration and design systems 400-500 include a variety of components and processing features which will now be discussed in greater detail.

Example Implementation Architecture

FIGS. 4 and 5 show schematics of implementations for the multi-tier configuration framework. This allows a user/designer to interactively configure products with assistance from the different configurators while abstracting the exact nature of the products and services provided by the suppliers.

This framework:
1) Represents products in an abstract data structure, which may be logically represented in a machine-accessible or computer-readable format.
2) Identifies possible suppliers for the components of a product.
3) Interacts with the configurator of the suppliers to configure the user's intended product in a distributed network-based setting (e.g. World Wide Web (WWW), Internet, etc.).
4) Maintains a database of product concepts which can be searched by the user.
5) Interacts with the customer intelligently and understands the customer's needs.

This framework includes the following components:
1) Transaction Manager: The transaction manager regulates the information flow between the user and the configurators of the sub-concepts. The configurators that handle each of the sub-concepts are called unit configurators. The transaction manager provides access to the appropriate unit configurator through a search on its data store (e.g., database, data warehouse, directory system, etc.). This data store may include a list of all the unit-configurators in the system along with a brief description of their product line.

2) Unit Configurator: The unit configurator interacts with the transaction manager to offer configuration solutions to the user. The unit configurator may interface with a catalog to offer products. The unit configurator provides the solution for its concept that meets the specification given as input. The logic of configuration is stored in the unit configurator that uses the internal transaction manager to generate solutions from those of its siblings (other unit configurators). In this embodiment, three basic types of unit configurators are identified:

I. Dedicated Configurators: The logic of configuring just a single product concept is programmed into the configurator. Any change in the product concept requires reprogramming the configurator. This type of configurator is particularly useful for designing product concepts that change very slowly.

II. Catalog based Configurators: These configurators handle standardized product concepts such as fasteners. All the product concept instances are available in a repository that is queried to provide the configuration solution.

III. Concept definition based Configurators: These are generic configurators that use the Concept to provide configuration solutions. These configurators have internal transaction mangers to connect to other configurators for the sub-concepts to provide configuration solutions.

3) Analysis Manager: In general, the constraints among sub-concepts are algorithmic in nature. The analysis manager interfaces with dedicated third-party solvers to execute and propagate such constraints. The analysis manager provides mechanisms for reuse of analysis for purposes of expediting the configuration process.

4) Concept Editor: The concept editor provides a tool for abstracting the design process. The product architecture and the topology are designed in the concept editor. The concept editor also provides a mechanism for the designer to impose/relax instance-specific constraints and performing graph operations on the concept.

5) Form Manager: The form manager acts as a liaison between the CAD systems of the user to the configurator. The form manger helps extract physical connectivity between the sub-concepts and create a preliminary topology to which the designer can add functional constraints. The form manager also acts as a map between the parameter definitions in the concept to the solid model of the product. In an embodiment of the framework, the assembly and geometric constraints are delegated to the CAD system through a mechanism provided by the form manager. Form manager may provide interoperability between different CAD environments.

It is noted that the components are presented for purposes of illustration only, as some components may be subsumed into other ones of the components, some components may be added, and some components may be removed without departing from the teachings presented herein.

For example, in some arrangements, the multi-tier and multi-domain distributed rapid product configuration and design systems 400-500 may also include the following components:

1) Customer Agents: A customer agent handles the interactions of a particular user. This module communicates with the transaction manager to facilitate the user configuration of a product. The configurator coordinates the distributed configuration process for the particular user with whom it is associated. At this stage, it is useful to distinguish between at least two different types of users: a common consumer, who just wants to customize an existing concept to suit his/her needs, and an experienced designer, who is trained in product design and hence is capable of putting together sub-concepts and synthesizing new product concepts. The common consumer would typically pursue configuration by concept, whereas an experienced designer would need configuration by synthesis.

2) Supplier Agents: A supplier agent is a software module that resides on the supplier side of the framework. This agent is the only component on the supplier side that interacts outside the supplier's system to ensure the safety of the supplier data. It may include two modules: a configurator then interacts with the transaction manager to offer configuration solutions to the customers and, with the demand chain management module of the framework, to interact with the supplier's ERP (Enterprise Resource Planning) backbone. The supplier agent interfaces with a catalog of the supplier products. The configurator architecture interacts with the configurators of its vendors in its internal supply chain to offer sub-concept solutions to the customer.

Search Agent: The search agent allows a multi-modal search comprised of ontology as well as a geometry-based search. Users will be allowed to store their product concepts for use by future customers of the systems 400-500. This will allow new users to easily accustom themselves to the two ways of configuring products through the framework. The new user can (1) browse through categories of past designs or (2) search for a particular concept of interest. The search process can be initiated either (a) by composing a simple concept graph, or (b) by entering text-based queries in the user interface. For facilitating text-based queries, tools may be implemented for companies to build ontology more easily. Once a new concept is synthesized using known parts and some new ones, it is then available for search and use in configuration by concept. Thus, the framework will allow for innovation through reuse.

The interaction of the components of the systems 400-500 is dependent upon a data model for products. Accordingly, an example data model for an example product is now presented.

Figure 6:
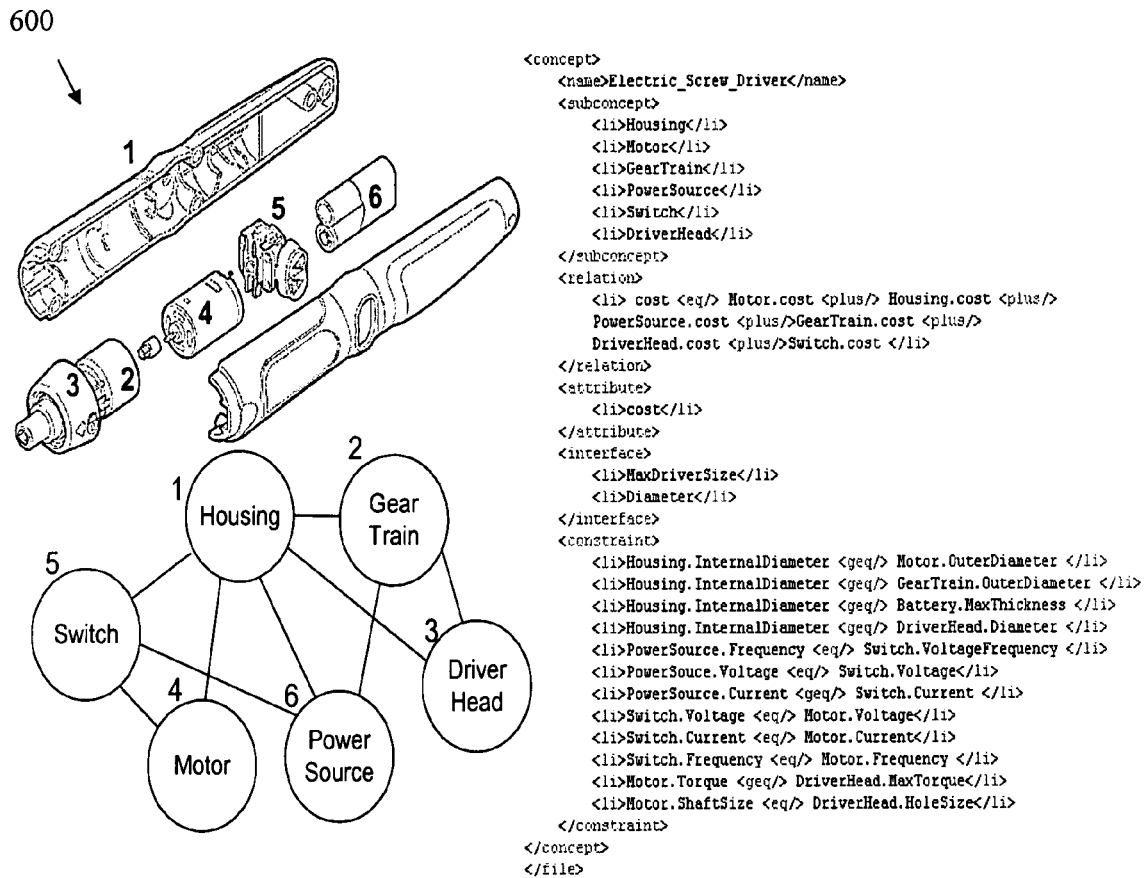
FIG. 6 is a diagram of an example schematic for a product, its concept graph, and an example schema, according to an example embodiment.

FIG. 6 is a diagram 600 of an example schematic for a product, its concept graph, and an example schema, according to an example embodiment. The product is a cordless electric screw driver.

The left-side of FIG. 6 depicts two views of the cordless electric screw driver. The first view depicts the forms for the components of the cordless screw driver as they may graphically and visually appear to the naked eye. The second view depicts a concept graph that presents a machine-readable view or representation of the components of the cordless screw driver. The view on the right-hand side of FIG. 6 depicts a textual schema for the concept graph that assists service and applications within a machine to understand, generate, and interpret the concept graph.

In an embodiment, such as the one presented in FIG. 6, the schema for the concept graph may be represented in extensible markup language (XML). Data exchange using XML promises many advantages such as interoperability, platform independence, and flexibility of representation. The XML schema for the cordless screwdriver's concept graph represents the attributes of the product and the constraints associated with the components of that product. In some cases, different suppliers may have different (proprietary) schemas for representing the same product. In such cases, a map may be implemented between the proprietary representations to a standard schema, such as the schema presented on the right-hand side of FIG. 6. The ontology associated with the product concept helps the definition of attributes and provides a simple description for a lay person.

The main components of the screw driver are the housing, power source, switch, motor, gear train, and driver head. Each component in the product is represented as vertices in the concept graph, and the constraints between them as the arcs of the graph. This representation of the product at the abstract level is called the "Product Concept Graph." An approach to representing the constraints and attributes in XML is also shown in FIG. 6. It is, however, noted that the vertices, called "sub-concepts," can themselves be composed of sub-components. For example, a motor which is a sub-concept of the cordless electric screw driver is made up of rotor, housing, brushes, etc. Each product concept graph represents a product family whose members can be generated with particular components. This provides for a broad range of customization based on the user's requirements.

Figure 7:
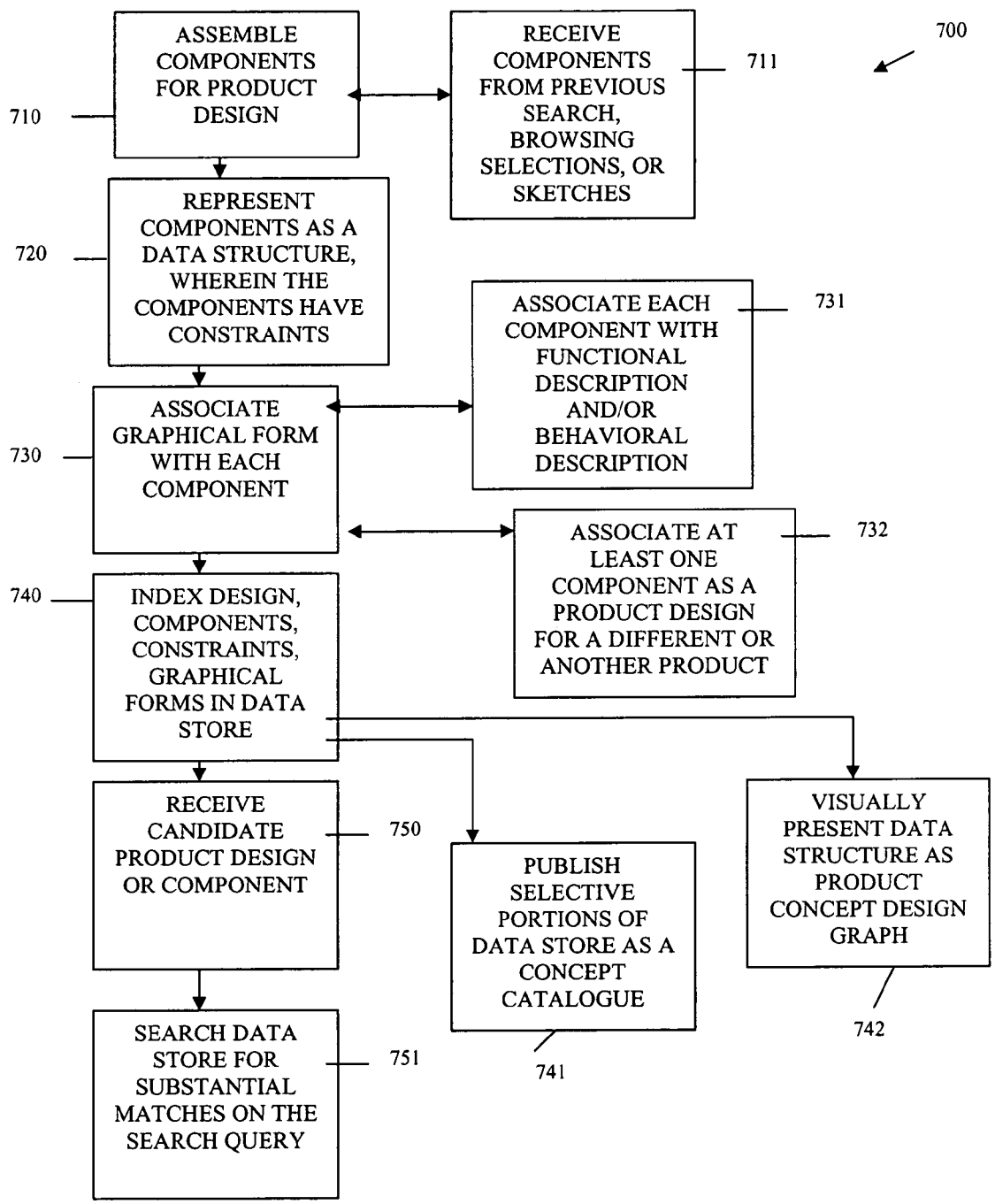
FIG. 7 is a diagram of a method for generating and manipulating product design information, according to an example embodiment.

FIG. 7 is a diagram of a method 700 for generating and manipulating product design information, according to an example embodiment. The method 700 (hereinafter "design service") is implemented in a machine-accessible and readable medium and is operational over a network. The network may be distributed to include a plurality of participants or it may be peer-to-peer (P2P). Additionally, the network may be wired, wireless, or a combination of wired and wireless.

The design service includes one or more interfaces, such as the concept editor, customer agent, and/or transaction manager presented above with the systems 400-500. At 710, the design service uses one or more of these interfaces to assemble components for a product design. In an embodiment, at 711 these components may be acquired or identified by the design service in a variety of manners.

For example, a designer may search a data store for some of the components. The designer may browse a data store for some components. The designer may browse user-defined or industry-defined categories or clusters associated with a number of the components. Furthermore, the designer may digitally sketch a number of the components.

Additionally, the designer may textually describe attributes or specifications associated with a number of the components and these attributes or specifications may be used as a search against one or more data stores to acquire the desired components. Thus, the design service can assist a designer in selecting or acquiring desired components in a variety of manners.

At 720, the components are represented internally by the design service as a data structure. In one embodiment, this data structure is the product concept described by way of example in FIG. 6C. The data structure includes constraints that represent the relationships between each of the components with respect to one another. Each component may also include a variety of attributes more fully describing a particular component in a standardized format.

At 730, a graphical form is associated with each component. That is, a component may also be associated with a form that is three-dimensional and recognized by designer. For example, a housing labeled 1 in FIG. 6 is depicted in FIG. 6 in the upper right-hand side in a graphical form. The graphical form permits a designer to visualize what he/she is building. It should also be noted, that the design system can search on user-supplied graphical forms to locate desired components making up the product design.

In an embodiment, at 731 each component may also be associated with a functional description and/or a behavioral description. These descriptions provide more detail to the designer about particular components. This is useful for the designer in selecting or reusing components.

It should also be noted in some embodiments, at 732, that at least one or more of the components may be recognized by the design service as their own independent product designs. That is, the product design may be nested such that each component may be its own product design. In this manner, the product design is hierarchical or multi-tier.

At 740, the product design and its components, constraints, graphical forms, functions, behaviors, etc. are indexed in a data store. The data store may be secure or implement security policies at a particular site, but may still permit distributed searching and configuration by making decisions about security on a case-by-case basis. Alternatively, the data store may be distributed such as a data warehouse where a plurality of disparate and geographically dispersed databases are interfaced or coordinated through the data warehouse. In this situation, a warehouse may be used to tie supplies of components together in a network.

In one embodiment, at 741, selective portions of the data store may be published or communicated to external agents or services as catalogues. The data structure represents knowledge about product designs and their components and the knowledge may be packaged in the form of catalogues. Knowledge in the form of catalogs is distributed across the suppliers and accessed by the supplier agents ensuring privacy of proprietary data. The customer agents define the global and local constraints based on user interaction. A transaction manager conveys these local constraints to the supplier agents. The supplier agents that meet these constraints send their quotes to the customer agents through the transaction manager. The customer agent finally selects the best suppliers by validating the global constraints and optimizing based on customer requirements. Thus, only selective portions of a particular product design or of a data store may be published and communicated in a distributed environment, and that knowledge may be used to obtain components that a designer uses to build his/her product.

In some embodiments, at 742, the design service may also selectively visually present the data structure as a product concept design graph. A concept editor, such as the one presented above with respect to systems 400-500 may permit a designer to interactively view and manipulate the product concept design graph for purposes of redefining components, replacing components, or identifying specifications for certain components. In some cases, the concept editor may permit the designer to manually draw a digital sketch and provide various aspects associated with components.

In some embodiments, the design service is used to assemble a knowledge store and may also act or interface with other agents in a distributed environment for purposes of extracting knowledge from the data store when requested to do so. Thus, at 750, a candidate product design or candidate component may be received via an agent or other service (local or distributed) as a search query.

In response to the search query, the design service, at 751, searches the data store or knowledge store for substantial matches on the search query. It is noted that since a component or a design may have a plurality of dimensions (forms, functions, behavior, specification, attributes, etc.) and since different vocabularies may exist between engineering disciplines that exact searching is not used; rather substantial matches are sufficient to indicate a match when a search is performed against the data store. The determination of what is considered substantial may be configured within the design service to the desires of an enterprise or an industry.

It has now been demonstrated how a product concept may be represented in a multi-tier or hierarchical manner such that the product concept itself includes a variety of sub-concepts or components. The product concept may be represented within a machine-accessible medium as a data structure, such as a concept graph. The relationships or constraints may be depicted in that data structure to show relationships or dependencies between concepts. The data structure may be interacted with through interfaces and used to dynamically assemble or build from scratch a product design. Furthermore, the data structure may account for component function and behavior. The data structure or portions thereof may be stored in a data store as knowledge and later used for purposes of search and retrieval.

Figure 8:
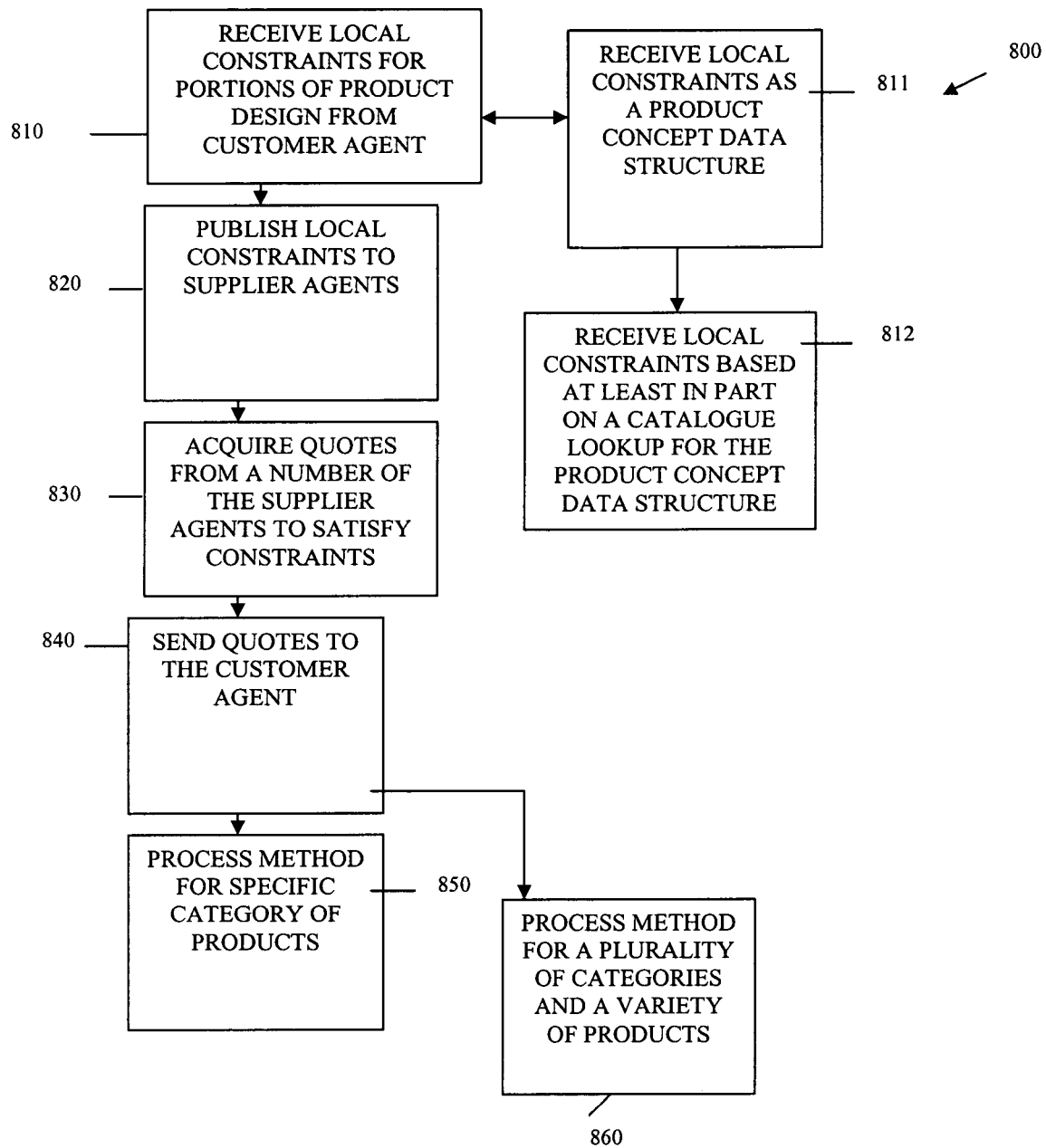
FIG. 8 is a diagram of a method for product configurator service, according to an example embodiment.

FIG. 8 is a diagram of a method 800 for product configurator service, according to an example embodiment. The method 800 (hereinafter "product configurator service") is implemented in a machine-accessible and computer-readable medium and is accessible over a network. In one embodiment, the product configurator service may be implemented as a transaction manager, such as the transaction manager presented and described above with respect to the systems 400-500. In other embodiments, some instances of the product configurator service may be implemented as agents within supplier environments or customer environments and the instances interact with one another over a distributed network or a P2P network.

At 810, the product configurator service receives local constraints for portions of a product design from a customer agent or customer interface. Some example ways in which the customer agent or interface may acquire and communicate those constraints for the product design or components was presented above with respect to the design service represented by the method 700 of FIG. 7.

For example, at 811, the local constraints may be received as a product concept data structure or portions thereof. Examples of the product concept data structure were presented and described above with FIGS. 6 and 7. In addition, at 812, the local constraints maybe based at least in part on a catalogue lookup for the product concept data structure. Descriptions of the catalogue were presented above with embodiments of the method 700.

At 820, the product configurator service publishes the local constraints to one or more supplier agents. Essentially, the product configurator service identifies potential supplier agents that may have components that satisfy the constraints by searching its knowledge store. Next, the local constraints are dynamically pushed over a network to the identifier suppliers.

Once the suppliers process the local constraints against there knowledge stores or catalogues, at 830, the product configurator service subsequently acquires information from a number of the suppliers that can satisfy the local constraints and that are willing to submit a bid to supply the components associated with satisfying the local constraints.

At 840, the product configurator service sends the information received from a number of the suppliers to the customer agent or service. At this point, the customer agent or service may make a determination as to the supplier that he/she wishes to interact with and may place an order for the component(s) that the customer desires and that satisfies the customer's local constraints for his/her product design.

In an embodiment, at 840, the processing of the product configurator service may be associated with a specific engineering discipline, business, or category of products. In other embodiments, at 850, the processing of the product configurator may be generic and processed for a variety of engineering disciplines, businesses, or categories associated with a variety of products.

The processing of the product configurator service demonstrates how a product configurator may assist in configuring or completing a product design for a customer. The product configurator service may interact with other instances of product configurator services. Additionally, the product configurator service processes product design concepts or components and is capable of lookup knowledge from knowledge sources, such as catalogues. Furthermore, the product configurator service may be a single-purpose configurator or may be a multi-purpose configurator.

Figure 9:
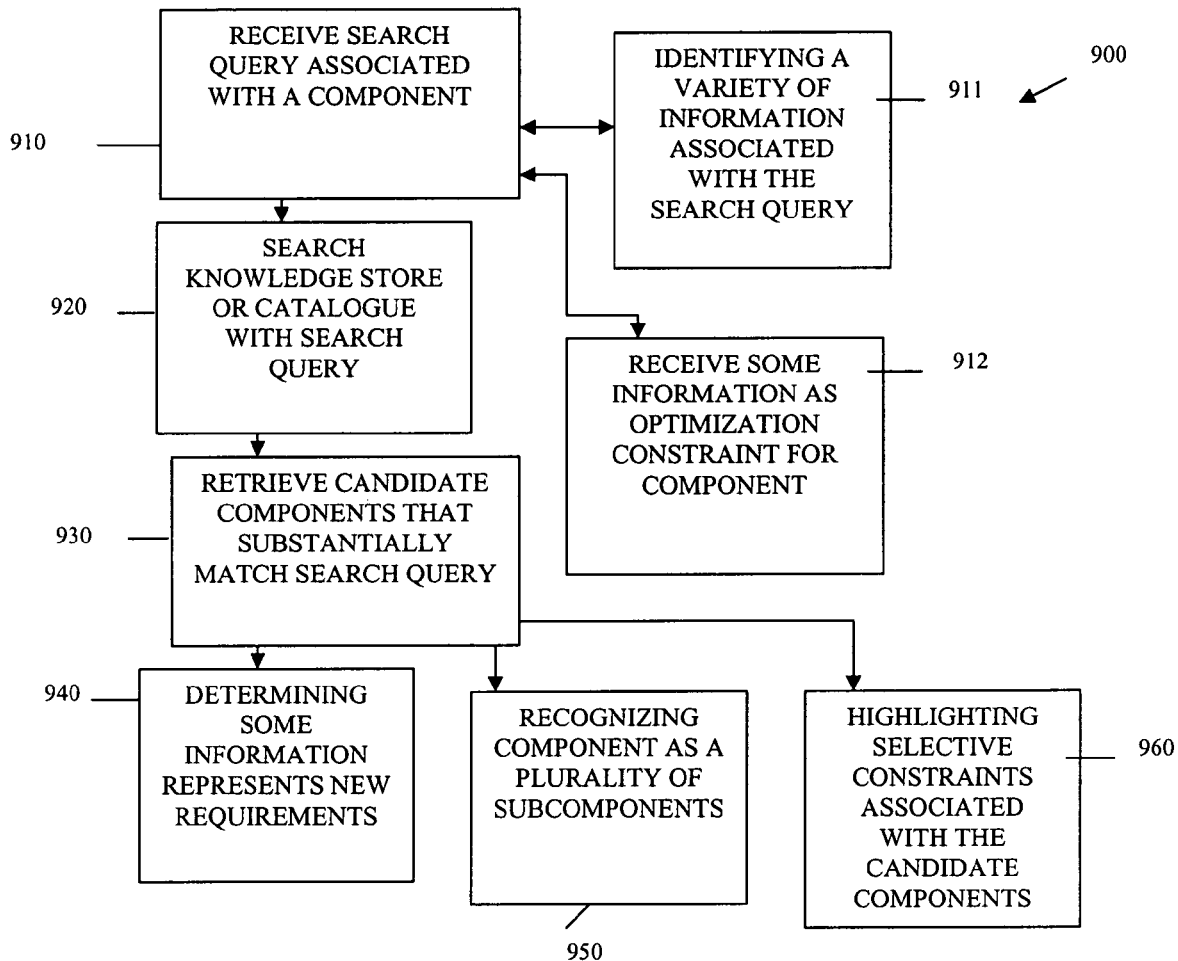
FIG. 9 is a diagram of a method for a search service, according to an example embodiment.

FIG. 9 is a diagram of a method 900 for a search service, according to an example embodiment. The method 900 (herein after "search service") is implemented in a machine-accessible and readable medium and is operational over a network. In an embodiment, the search service interacts and compliments or assists the methods 700 and 800 of FIGS. 7 and 8.

At 910, the search service receives a search query associated with a component. The search query may completely describe the component. Alternatively, the search query may simply partially define the component. In fact, in some embodiments, at 911, the search query includes a variety of information. Some example types of information may include, but are not limited to, a partial graphical form for a component, a description of a component, a specification for a component, a function associated with a component, a behavior associated with a component, and others.

According to an embodiment, at 912, the information associated with the search query may include an optimization constraint. For example, a constraint may ask that the maximum acceleration and handling be obtained for a given component, which is for a vehicle design. An analysis manager, such as the one discussed above with the description of the systems 400-500 may be used to achieve such an optimization. The optimization may be associated with the overall topology of the component. An example case for resolving this optimization is presented below with respect to FIG. 11.

At 920, the search service searches a knowledge store or catalogue or other sources of knowledge with the search query. A variety of techniques exist to perform multi-dimensional searches, any such technique may be used with the embodiments presented herein. One technique for search three-dimensions and/or two-dimensions was presented in U.S. application Ser. No. 10/763,741 filed Jan. 23, 2004, entitled: "Methods, Systems, and Data Structures for Performing Searches on Three Dimensional Objections," the disclosure of which is incorporated by reference herein. This approach and other approaches may also be modified or augmented to include the search terms associated with product concept graphs, such as the product concept graph data structures described above.

At 930, the search service retrieves any candidate components from the knowledge store which substantially match the search query. That is, the match against the knowledge store does not have to be exact as long as a certain predefined percentage of information within the search term maybe matched against a candidate component than that component may be considered as a substantial match.

In an embodiment, at 940, some information associated with the search query may represent new requirements not previously known or associated with a particular component. In these cases, the new requirements may be submitted to closely matching suppliers for development; alternatively, closely related components may be returned from the search with the caveat that not all requirements were met with the search query with the returned candidate components, since the search request was associated with new requirements. In other embodiments, the new requirements may be fed to analysis managers, such as what was discussed above for purposes of dynamically and automatically generating a new component from existing components that does meet the new requirements.

According to another embodiment, at 950, the component itself may be an entire topology for a product design, such as a car. That is, the components are hierarchical and may be considered multi-tier. In other cases, the component may be a primitive and not associated with an entire product design, but used rather as a piece for a plurality of other product designs.

In another embodiment, at 960, the search service may return the candidate components with selective constraints highlighted within the candidate components for purposes of attracting the attention of the designer.

The search service demonstrates how searching may acquire components for previously analyzed and indexed product designs and their components. In some cases, entirely new components may actually be generated where they did not previously exist by using new requirements. Some search terms may be used to perform topology optimization and some constraints or concepts may be highlighter in returned components associated with searching.

Figure 10:
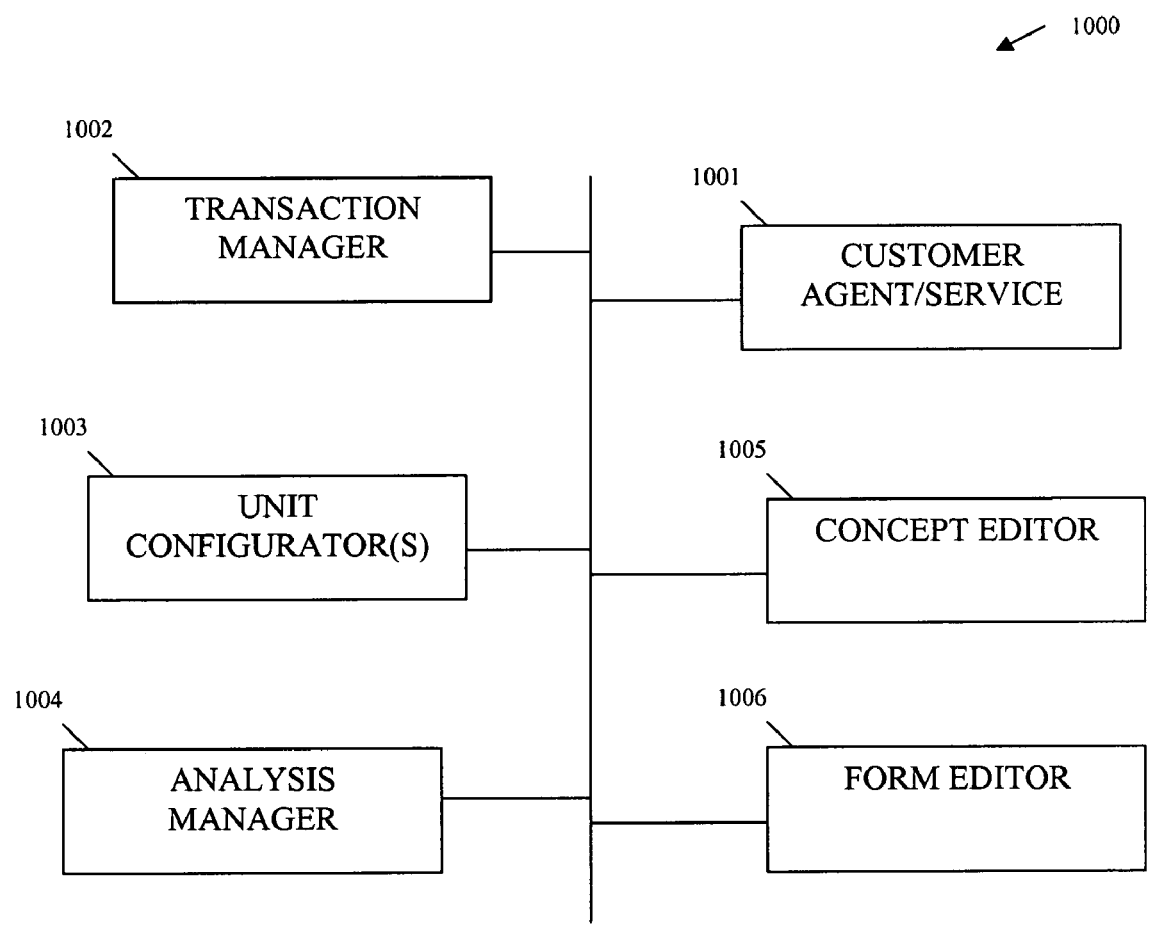
FIG. 10 is a diagram of another multi-tier and multi-domain distributed rapid product configuration and design system, according to an example embodiment.

FIG. 10 is a diagram of another multi-tier and multi-domain distributed rapid product configuration and design system 1000, according to an example embodiment. The multi-tier and multi-domain distributed rapid product configuration and design system 1000 is implemented in a machine-accessible and computer-readable medium and is operational over a network. The network may be wired, wireless, or a combination of wired and wireless. Moreover the network may be distributed or P2P. In an embodiment, the multi-tier and multi-domain distributed rapid product configuration and design system 1000 implements, among other things, the processing of the methods 700, 800, and 900 of FIGS. 7-9, respectively.

The multi-tier and multi-domain distributed rapid product configuration and design system 1000 includes a customer agent or service 1001, a transaction manager 1002, and one or more unit configurators 1003. In an embodiment, the multi-tier and multi-domain distributed rapid product configuration and design system 1000 also includes an analysis manager 1004, a concept editor 1005, and/or a form editor 1006.

The customer agent or service 1001 interacts within a customer environment to obtain definitions for product designs. The product designs are represented as concept graph or component graph data structures. In some embodiments, a customer interacts with a concept editor 1005 interface that permits the customer to assemble components for a product design from scratch, from browsing a knowledge store, from search and retrieval, or from optimization requests. The customer agent 1001 is adapted to acquire a specification for the product design from a customer as a product concept graph data structure or portions thereof or as optimization requirements.

The transaction manager 1002 receives the specifications from the customer agent 1001 and determines which unit configurators 1003 are available to meet the specifications. In an embodiment, the transaction manager 1002 may enlists the services of an analysis manager 1004, such as when the specification includes optimization requirements or new requirements for components or product designs that do not exist. The analysis manager 1004 interacts with other services to product a component or product design that conforms to the new requirements or optimization requirements.

The unit configurators 1003 suggest solutions for the specifications submitted by the customer agent 1001. To do this, the unit configurators 1003 interact with the transaction manager 1002. In some cases, a unit configurator 1003 exists within the network for each unique supplier. In other cases a single unit configurator 1003 may exists for groups of suppliers or a variety of products.

In another embodiment, the multi-tier and multi-domain distributed rapid product configuration and design system 1000 also includes a form editor 1006. The form editor is adapted to assist the concept editor 1005 in presenting, defining, searching, and manipulating three or two dimensional graphical forms that represent the components or designs.

One now appreciates how information relevant to product and designs may be modeled in multi-tier format. The knowledge may be indexed, searched, and published in a distributed environment. Moreover, agents or services may be used to coordinate the knowledge and in some cases derive new knowledge based on new requirements by optimizing pre-existing components or designs. This permits rapid designing of products and reuse of design components across a variety of engineering disciplines.

Figure 11A:
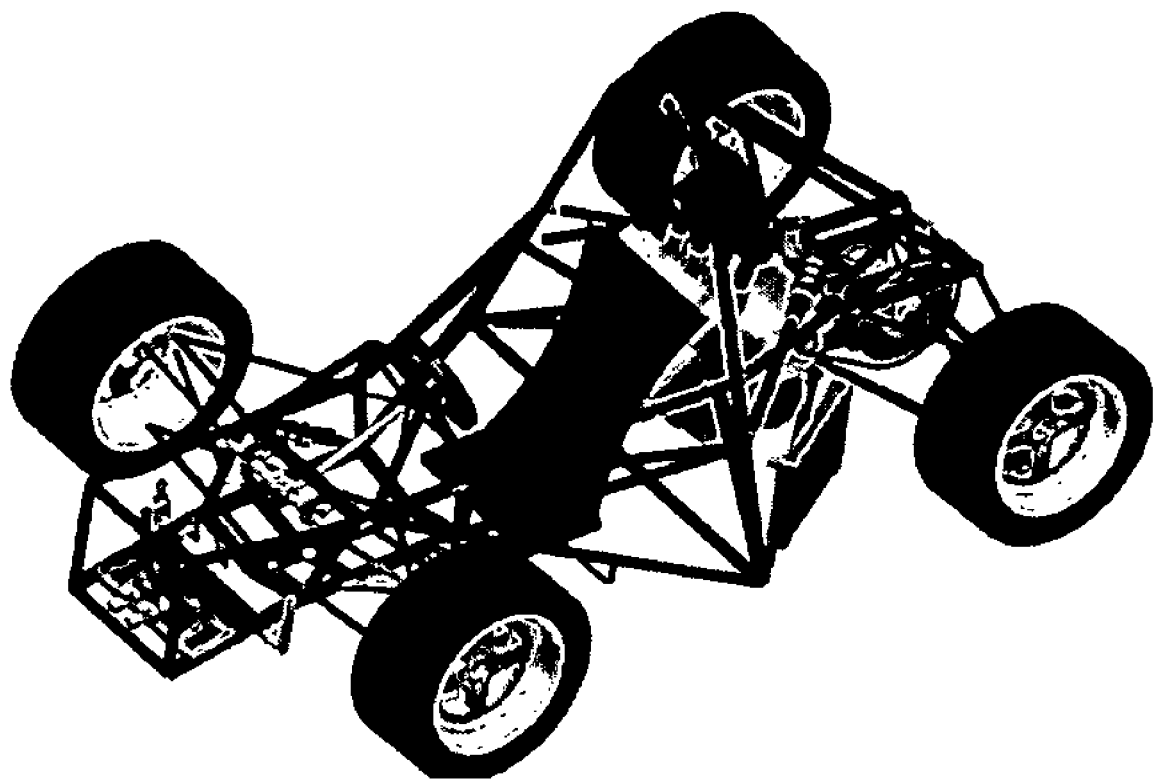
FIG. 11A is a diagram of an example Formula SAE vehicle presented with an optimization example, according to an example embodiment.
Figure 11B:
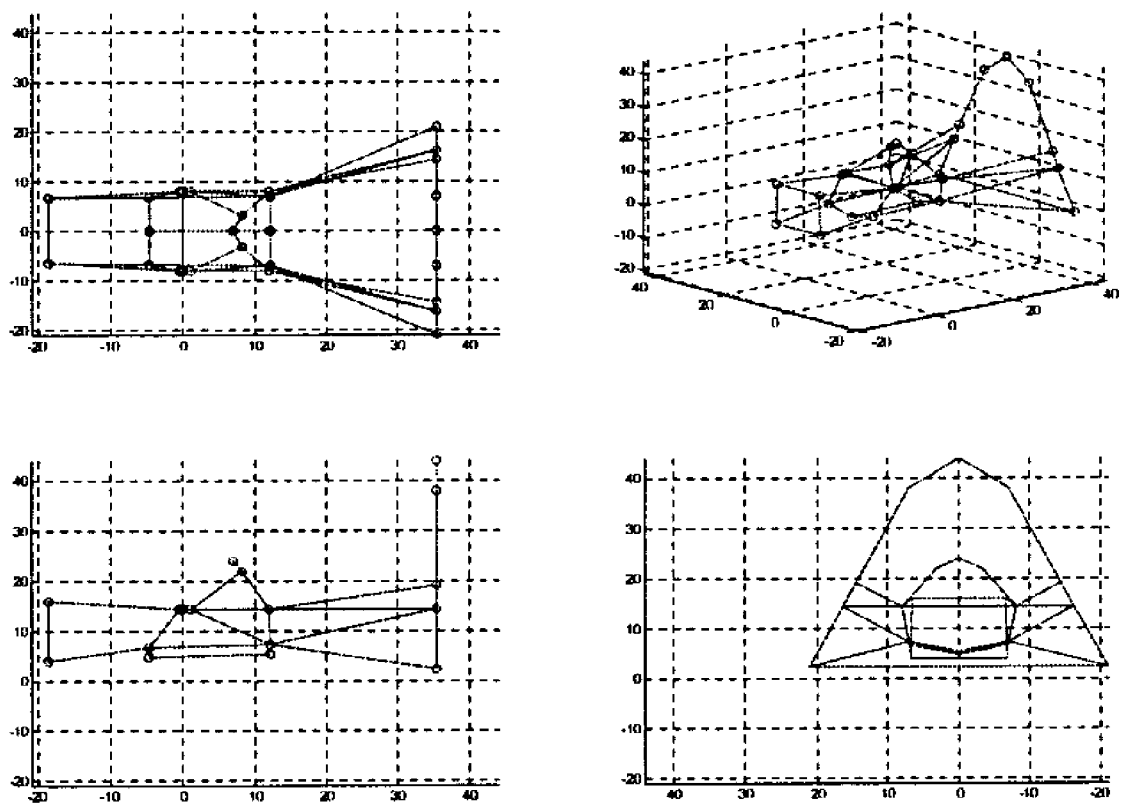
FIG. 11B is a diagram of a topology of a cockpit for the vehicle presented in FIG. 11A, according to an example embodiment.

An example application of the above teachings is now presented in FIGS. 11A-11D. FIG. 11A depicts an example module of a Formula SAE vehicle. The designer of this car desires to achieve an objective associated with: "maximum dynamic performance from the vehicle in terms of its handling and acceleration. However, these are competing and often mutually exclusive objectives; meaning that any attempt to increase handing through techniques such as a stiffer chassis or uniform weight distribution will lead to increased mass in the vehicle which will limit the acceleration.

In addressing this problem, a smaller subset of the design problem may be configured, namely the chassis and the suspension. The chassis includes several tubes welded together. The spatial arrangement of the tubes and the specification of each of the tubes determine its performance (weight and stiffness). The chassis is designed to consist of two parts (cockpit and the rear box) that bolt together at the roll hoop, between the driver and the Engine. The suspension includes two upper control arms and two lower control arms that control the geometry of wheel travel. The tie rod transfers the motion of the wheel to the shock absorber through the rocker. In this example, three configurators, namely the chassis configurator, ergonomic configurator and the suspension configurator are used by the car configurator to provide configuration solutions. The coupling between the chassis and the suspension configurators exists as suspension mounting points on the chassis, suspension loads on the chassis and the torsional rigidity of the chassis on the suspension.

Chassis Configurator

This unit is structured as a topological optimization coupled with a translator based on skeletonization to a space frame structure coupled with a space frame optimization. The initial 'chunk' geometry is initially partitioned and reduced by removing areas where the proposed main components of the car will be attached to the chassis. This reduced model is then fed to a topological optimization method with a specified percentage reduction in density and a convergence condition. The resultant densities are then used via a skeletonization scheme which cuts away at the density model until only lines and vertices remain. These vertices are then optimized to complete the chassis configuration. Specifically, the objective is to maximize:

Stiffness(P, T)

Given: $\psi$, the topology connecting $n$ points with $m$ members $$\psi(i, j) = \begin{cases} 1 & \text{if there is a member between nodes } i \text{ and } j \\ 0 & \text{otherwise} \end{cases}$$

$P^0 = \{p_1^0, p_2^0, p_3^0, \ldots p_n^0\}$, are the initial location of nodes Where, $P = \{p_1, p_2, p_3, \ldots p_n\}$, are the locations of each node.

$T = \{t_1, t_2, t_3, \ldots, t_m\}$ are the selection for each member.

$S = \{s_1, s_2, s_3, \ldots, s_k\}$ are the stock tubes available

Subject To:

$t_i \in S$ (1)

$|p_i - p_i^0| \le R, \quad i = \{1, 2, 3, \ldots n\}$ (2)

Weight$(P, T) \le W_0$, the given weight (3)

The constraints are geometric in nature where a set of volumes are given that should not intersect with the chassis volume. These volumes are the envelopes of the driver seating (entry and exit), the engine and other sub-systems. For this example, these are simplified as constraints on the location of the joints (nodes) represented by a radius from the seed point.

Further, the constraint total weight of the structure should be less that what is specified by the designer. Also there are some nodes in the structure where the chassis interfaces with the other subsystems in the vehicle such as suspension, power-train etc. These points are considered fixed and cannot be modified.

The choice of tubing for the members is governed by the official rules of formula SAE. Hence the tube thickness should be greater than or equal to that specified in the rules.

The loads on this structure consist of two components:

1) The static component which includes the weights of all sub-systems in the car.
2) The dynamic component that appears at the node that is attached to the rocker and the shock absorber.

The structure is to be maximized for torsional stiffness. In the implementation, this problem is posed as minimization of torsional deflection.

This problem lends itself to GA based optimization. The variables for the optimization are as follows:

$\{r, \theta, \phi\}$ for each node. Here $r$ is the distance from the initial node location. $\theta$ and $\phi$ angles from the x axis (in the X-Y plane) and the Z axis respectively.

$t_i$, an index representing the choice of material for a member.

Figure 11C:
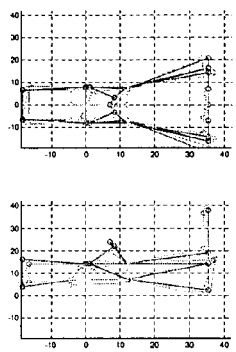
FIG. 11C is a diagram of an optimized chassis for 48 pounds for the chassis of the vehicle presented in FIG. 11A, according to an example embodiment.
Figure 11D:
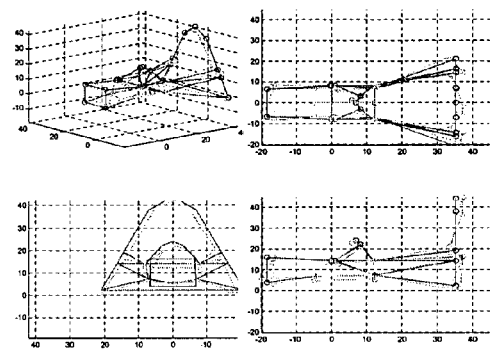
FIG. 11D is a diagram of an optimized chassis for 50 pounds for the chassis of the vehicle presented in FIG. 11A, according to an example embodiment.

FIGS. 11C and 11D show some typical results obtained from an optimization routine.

Ergonomics Configurator

In this embodiment, the ergonomics configurator is implemented as a Dedicated Configurator that provides the human kinematic envelope to allow the driver to enter, exit and operate the vehicle in accordance with ergonomic constraints. Constraints such as exiting requirements in terms of time for emergency evacuation, as stipulated by the Formula SAE rules, are enforced in this configurator.

Suspension Configurator

In this embodiment, the Suspension Configurator is designed be a concept based configurator that interacts with three other configurators to provide solutions, namely: Rocker configurator, A-arms configurator, Tire configurator.

The Rocker configurator is an analysis based dedicated configurator of the rocker arm, which controls the motion ratio of a FSAE car suspension between wheel travel and shock travel. The analysis begins by specifying the desired motion ratio, based on individual characteristics of the shocks. The system then opens a CAD model of the rocker and inputs and updates the model. From this model, several key suspension points are calculated. These points are then fed into a kinematics model of the suspension. A single wheel travel analysis with a 2 inch range of motion is then simulated to extract the motion of the shock versus wheel travel. The derivative of this data set is then taken to determine the ratio. Optimization schemes are used to minimize the error between the desired ratio and the current one based on the inputs.

A similar dedicated configurator is used for designing the kinematics of the suspension (A-arms configurator). The Tire configurator is a catalog based configurator that uses the Pacejka Tire model to provide tire solutions from a database of available tires.

The configuration solutions provided by the Chassis and the suspension configurators are used to provide Car solutions by the concept based car configurator.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a computer-readable medium and executed by a computer for:

assembling, by the computer, components for a product design, wherein each component represents a graph identifying a portion of the product design;

representing, by the computer, the components as a data structure, wherein constraints between each component with respect to other ones of the components are represented in the data structure, and wherein the data structure is dynamically interacted with to assemble the product design or to build the product design from scratch by executing the constraints that are algorithmic from the data structure, and wherein the data structure is also a set that includes the components, the constraints, a concept graph, parameters, a form definition, and a process definition, wherein the form definition is another set defined by geometric features that represent a shape, and wherein the process definition represents a supply chain representation for the components and an evaluation procedure for analyzing the components, the supply chain representation is a system of resources, information, and technology for moving products or services from a supplier to a customer, the parameters are specific to the form and process definitions for the product, and wherein the concept graph includes a list of sub concepts and their connectivity to one another, the connectivity includes functional, operational, informational, and physical interactions between the sub concepts;

associating, by the computer, a graphical form with each of the components; and indexing, by the computer, the product design, the components and the constraints of the data structure and the graphical forms in a database for subsequent search and retrieval from the database.

2. The method of claim 1 further including, associating, by the computer, at least one of a functional description with each component and a behavioral description with each component.

3. The method of claim 1 further including:

receiving, by the computer, at least one of a candidate product design and a candidate component as a search query; and searching, by the computer, the database for substantial matches on the search query.

4. The method of claim 1 further including, publishing, by the computer, selective portions of the database as a catalogue.

5. The method of claim 1, wherein assembling further includes receiving the components from at least one of previous search results acquired from the data store, previous browsing selections made from the data store, and digital sketches supplied though an interface to the method.

6. The method of claim 1, further including associating, by the computer, one or more of the components as product designs for other products, wherein the one or more of the components are primitive graph data structures that are each associated with a piece of the product design and at the same time pieces of the other product designs.

7. A method implemented in a computer-readable medium and executed by a computer for:

receiving, by the computer, a search query associated with a component, wherein the search query includes a plurality of information associated with a product concept graph, and wherein the component is represented as a graph data structure for a portion of a particular product design, and wherein the search query either completely defines the component or partially defines the component, and wherein the plurality of information includes one or more of the following: a partial graphical form for the component, a description for the component, a specification for the component, a function assigned to the component, and a behavior assigned to the component, and wherein the product concept graph includes the component and other components for the particular product design along with linkages representing constraints within the particular product design between the component and the other components, the constraints are algorithmic and executed from the graph data structure, the constraints included in the graph data structure, and wherein each component is a set that includes a particular concept graph, parameters, a form definition, and a process definition, wherein the form definition is another set defined by geometric features that represent a shape, and wherein the process definition represents a supply chain representation for the components and an evaluation procedure for analyzing the components, the supply chain representation is a system of resources, information, and technology for moving products or services from a supplier to a customer, the parameters are specific to the form and process definitions for the particular product design, and wherein the particular concept graph includes a list of sub concepts and their connectivity to one another, the connectivity includes functional, operational, informational, and physical interactions between the sub concepts; and retrieving, by the computer, from a database search results for candidate components that substantially match the search query, wherein a substantial match occurs when a predefined percentage of the search query matches the candidate components.

8. The method of claim 7 further including, determining, by the computer, that at least some of the plurality of information does not exist in the database and represents new customer requirements for the component.

9. The method of claim 7, wherein receiving further includes receiving at least some of the plurality of information as an optimization constraint for the component, wherein the optimization constraint defines a requirement that has to be met for achieving optimization.

10. The method of claim 7 further including, recognizing, by the computer, the component as a plurality of subcomponents.

11. The method of claim 7, further including highlighting, by the computer, selective constraints associated with the candidate components to bring attention of a designer to the selective constraints.

* * * * *

UNITED STATES PATENT AND TRADEMARK OFFICE
CERTIFICATE OF CORRECTION

PATENT NO. : 7,725,299 B2  Page 1 of 1
APPLICATION NO. : 11/068482
DATED : May 25, 2010
INVENTOR(S) : Karthik Ramani et al.

It is certified that error appears in the above-identified patent and that said Letters Patent is hereby corrected as shown below:

On the face page, in field (75), in "Inventors", in column 1, line 1, delete "Karthnik Ramani," and insert -- Karthik Ramani, --, therefor.

In column 17, line 28, in Claim 5, delete "though" and insert -- through --, therefor.

Signed and Sealed this

Thirteenth Day of July, 2010

David J. Kappos
*Director of the United States Patent and Trademark Office*